Figure 1:
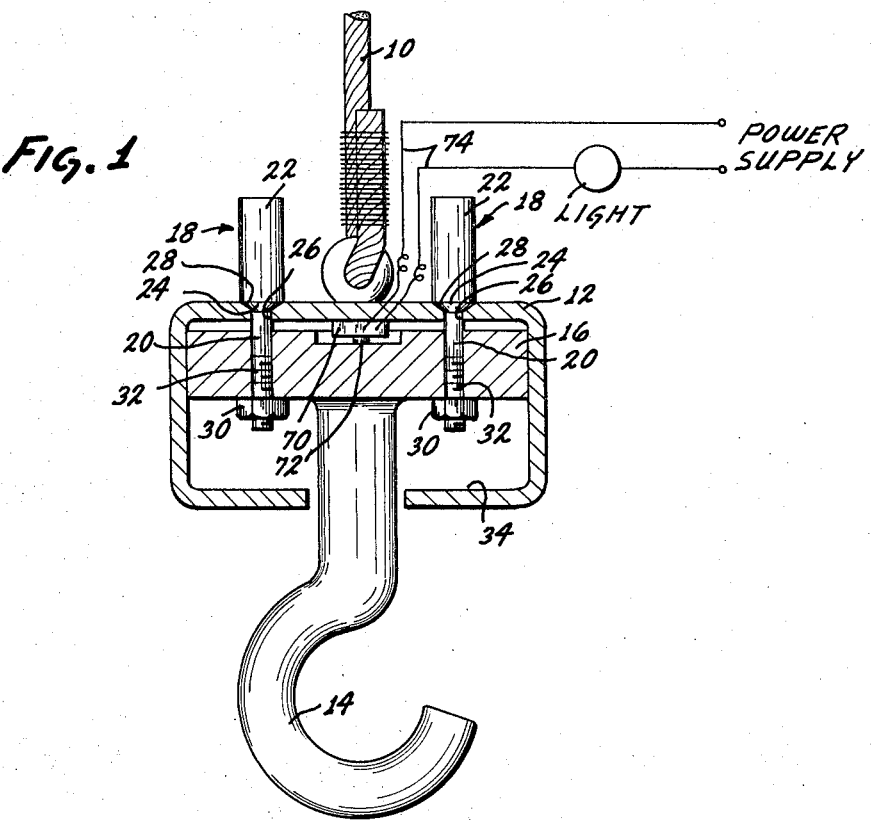

United States Patent [19]
Sandberg

[11] 3,802,379
[45] Apr. 9, 1974

[54] LOAD INDICATING FASTENER
[75] Inventor: Gary Karl Sandberg, Aloha, Oreg.
[73] Assignee: Omark Industries, Inc., Portland, Oreg.
[22] Filed: Feb. 7, 1972
[21] Appl. No.: 223,971

[52] U.S. Cl. .............. 116/114 R, 85/62, 116/67, 200/61.08, 340/272
[51] Int. Cl. .......................................... G01d 21/00
[58] Field of Search .......... 116/67, 114, 68; 85/62, 85/1 R; 280/449; 200/61.08, 61.18; 294/82; 340/272, 421

[56] References Cited
UNITED STATES PATENTS
2,283,354   5/1942   Dalzell .......................... 116/68
2,682,931   7/1954   Young ............................ 85/62
2,892,532   6/1959   McCallum ..................... 85/62 X
3,633,961   1/1972   Speransky .................... 294/82
3,714,859   2/1973   Tupper .......................... 85/1 R Primary Examiner—Louis J. Capozi

[57] ABSTRACT

A fastener including a bolt and a die thereon. The bolt has a drawable portion that is designed to be drawn through the die when a predetermined tensile force is exceeded.

2 Claims, 2 Drawing Figures

PATENTED APR 9 1974 3,802,379

LOAD INDICATING FASTENER

HISTORY

This invention relates to fasteners for indicating a condition of excessive force, e.g., overload.

In recent years it has become increasingly more important to establish the limits on load bearing devices and to provide indicators for indicating when that overload condition is reached. There has been much technology developed to accomplish this objective. Presently there exists for many load bearing devices complex mechanism and electrical devices which accomplish the desired indication of overload. However, as far as it is known, these devices are cumbersome and expensive, eliminating their applicability to many simple load bearing applications, e.g., bolts for fastening two critical parts together, cranes for lifting loads, and the like.

It is believed that the present invention provides a very reliable but inexpensive means for indicating overload condition. Very briefly, this invention in its preferred form is a bolt having a drawable head section and an intermediate tapered section that merges with the normal shank of the bolt. A die in the form of a washer has a hardness substantially greater than the hardness of the drawable portion of the bolt and has a tapered entry mated with the tapered section of the bolt. Means are provided for visual indication of the enlarged portion being drawn through the die. Thus by calculating the force needed to draw the drawable portion of the bolt through the die, it can be determined when parts being fastened together by the bolt are clamped together at that determined force. It is a simple matter to vary the drawable section of the bolt so as to provide any clamping force desired to the parts being fastened together.

Figure 2:
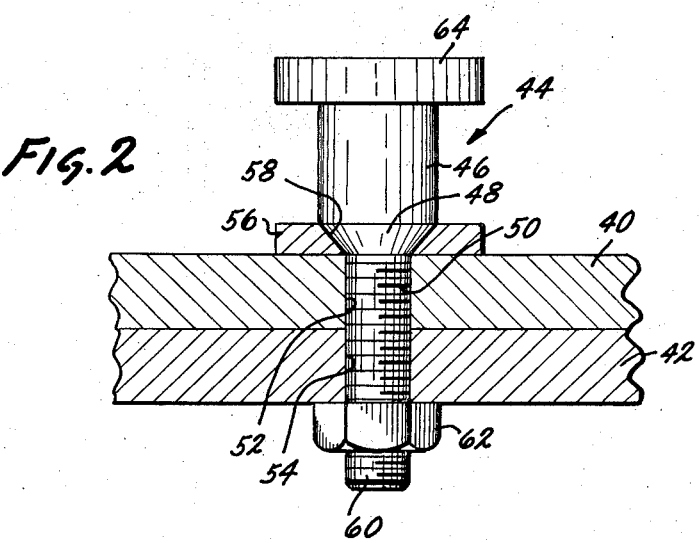

Having thus briefly described the invention, the invention and its advantages will be more clearly understood by reference to the following detailed description and drawings wherein:

FIG. 1 illustrates a preferred embodiment of the invention wherein the drawable bolt fastens a crane hook to crane cable; and FIG. 2 illustrates a second embodiment of the invention wherein a drawable bolt of the invention is used to fasten two parts together.

Referring to FIG. 1 of the drawing, it will be understood that cable 10 is suspended from the boom of a crane and has attached integrally thereto a channel member 12. A crane hook 14 includes a flange 16 adapted to fit inside the channel member 12. Bolts 18 securely fasten the flange 16 of the hook 14 to the top wall of the channel member 12 as shown. Bolts 18 are comprised of a shank 20 and a drawable head section 22 and an intermediate tapered section 24. Channel member 12 includes opening 26 adapted to receive the shank of the bolts 18 with tapered entry 28 for each opening 26 mated with the tapered sections 24 of the bolts. The shank 20 of the bolts pass through the flange 16 of the hook 14 and nuts 30 are threadably engaged with screw threads 32 provided on the free end of the shank 20. The channel member 12 is made of a metal having a hardness substantially greater than the bolt. Thus the opening 26 with the tapered entry 28 functions as a die through which the drawable head section 22 of the bolt 18 is drawn. It will be understood that the channel member 12 restricts downward movement so that the crane hook 14 will never be completely loosened from the boom and thereby creating a hazard to persons in the area by which a load from the crane may be dropped. Also, the total shank portion may be threaded so as to permit tightening where but a short segment of the drawable portion is drawn. Thus the bolt can be reused if no more than minor overload is encountered.

In operation it will be understood that the crane and hook will be rated with a specified load limit. This load limit will be converted into a tensile force. The bolt 18 is then designed whereby the drawable section is drawn through the die when the tensile force is exceeded. Complete separation of the crane hook from the cable is avoided by the channel shoulders 34. However, when the load limit is exceeded and the bolts are drawn, the operator will be able to immediately detect such overload by visual observation of the flange separating from the top of the channel member and resting on the shoulders 34.

Referring now to FIG. 2 of the drawing, two parts 40 and 42 are shown clamped together intended to represent numerous applications where a specific drawing force is desired for optimum fastening of two parts. The bolt 44 of the present invention is designed with a drawable head section 46, a tapered section 48 and a threaded shank 50. The shank passes through aligned openings 52 and 54 respectively, provided in parts 40 and 42. A die 56 in the form of a washer is provided with a tapered opening 58 which is aligned with the openings 52 and 54 and adapted to mate with the tapered section 48 of the bolt 44. The force required to draw the drawable section 46 of the bolt 44 through the die 56 equals the clamping force desired for parts 40 and 42. The shank 50 of the bolt 44 is provided with screw threads 60 and a nut 62 is threadably engaged with the screw threads. A suitable pattern may be provided on the drawable section 46 of the bolt 44 to visually indicate to the assembly worker when drawing of the drawable section is occurring. As the nut draws the bolt tightly in a clamping action, he will thus observe when the drawable section 46 begins to draw through the die 56, thus indicating when the required clamping force is reached.

A flange 64 may be provided on the free end of the drawable section 46 to prevent the assembly worker from drawing the bolt completely through the die. Also he may merely use the flange as a stop insuring that the desired clamping force has been equalled or exceeded in those cases where there is no critical upper limit of force. A further alternative is to thread the opening 54 in part 42 for engagement with screw threads 60 of the bolt, thereby eliminating nut 62.

Referring again to FIG. 1 of the drawings, it may be desirable to combine a further signal other than the visual indication of the flange 16 separating from the top of the channel member 12. Thus, an electrical switch 70 is shown having an off condition when a switch 72 thereof is depressed by the flange 16 butted against the top of the channel member 12. An electrical conduit 74 is connected to a bell, flashing light, or the like (not shown). Thus, when the load limit is exceeded and the flange 16 separates from the top of channel member 12, switch 72 is released sending an electrical signal to the bell or light, setting off the alarm to draw the operator's attention to the overload condition.

It will be understood that numerous variations of the above described load indicating device will be apparent to those skilled in the art without departing from the spirit of the invention. Thus, the scope of the patent granted herein is not to be limited to the specific embodiments described, but rather are limited only by the claims appended hereto.

What is claimed is:

1. A load indicating assembly including a device fastening two members together and load indicating means for signalling an operator when a determinable load is applied to the device comprising; at least two members in abutting relation with aligned openings for receiving the shank of a bolt, a bolt having a shank portion and an enlarged drawable portion, a die having a tapered opening larger than the shank portion of the bolt and smaller than the enlarged drawable portion of the bolt, the shank of the bolt inserted through the tapered opening of the die and through the aligned openings of the members, drawing and holding means engaging the end of the shank of the bolt on the side of the members opposite the enlarged drawable portion for drawing the bolt through the die and members to hold the members together under pressure, and signalling means in connection with the drawable portion of the bolt responsive to the drawing of the drawable portion through the die openihg to signal an operator of such drawing.

2. A load indicating assembly as defined in claim 1 wherein the bolt has a limiting head portion larger than the drawable portion provided at the end of the bolt opposite the drawing and holding means to prevent drawing of the bolt completely through the members.

* * * * *